United States Patent [19]

Smith et al.

[11] 4,135,757
[45] Jan. 23, 1979

[54] TRACTOR CAB AND SAFETY FRAME MOUNTING

[75] Inventors: Alfred R. Smith, West Bloomfield; Jaime Segales, Southfield, both of Mich.

[73] Assignee: Massey-Ferguson Inc., Detroit, Mich.

[21] Appl. No.: 726,315

[22] Filed: Sep. 24, 1976

Related U.S. Application Data

[63] Continuation of Ser. No. 541,910, Jan. 17, 1975, abandoned.

[51] Int. Cl.² .............................................. B62D 27/04
[52] U.S. Cl. .................................. 296/35 R; 296/28 C
[58] Field of Search ................... 296/35 A, 35 R, 102, 296/28 C; 280/150 C; 214/DIG. 7; 105/453; 248/15, 20, 21

[56] References Cited

U.S. PATENT DOCUMENTS

| | | | |
|---|---|---|---|
| 2,384,096 | 9/1945 | Kishline | 296/35 R |
| 3,112,950 | 12/1963 | Jaskowiak | 296/35 R |
| 3,185,415 | 5/1965 | Thorn | 248/21 |
| 3,525,548 | 8/1972 | Mutka | 296/35 R |
| 3,690,720 | 9/1972 | Whisler | 296/28 C |

FOREIGN PATENT DOCUMENTS 1170240  11/1969  United Kingdom ................ 296/28 C

*Primary Examiner*—Philip Goodman
*Attorney, Agent, or Firm*—William R. Nolte

[57] ABSTRACT

In a vehicle a safety frame and a cab, the cab entirely enclosing a personnel compartment is supported within the safety frame by resilient support members while the frame is rigidly mounted on the vehicle. Each of the support members includes at least one layer of elastomeric material secured between each of the leg members of the cab panel adjacent thereto for resiliently supporting the cab on the leg members such that in one embodiment the elastomeric material of each support member is loaded only in shear by the cab and in both compression and shear in a second embodiment, and the support members are in a plane containing the center of gravity of the operator and cab.

14 Claims, 9 Drawing Figures

TRACTOR CAB AND SAFETY FRAME MOUNTING

This invention relates generally to vehicle bodies, and is particularly concerned with the mounting of a cab forming the personnel compartment of a tractor or similar vehicle on a safety frame of the vehicle, the safety frame serving the functions to protect the occupants of the cab in the event the vehicle is overturned.

In tractors used in construction, industrial and agricultural operations, it is common to provide safety frames to protect the driver and other personnel riding the tractor in the event that the tractor overturns. Generally, the passenger cab enclosure is formed by panels which may be secured to the safety frame structure. Generally, the panels are secured to the outside of the safety frame and are supported by it. A significant problem with this type of vehicle is that of vibration of the cab and other parts of the vehicle body, and the attendant disadvantages including the resulting high noise level. Attempts to solve the above problems include isolating the cab from the vehicle proper, but this requires separating the cab from the vehicle platform which forms its bottom creating a problem of sealing the bottom of the cab from dirt and sound which would otherwise enter. It is not uncommon to isolate the cab by supporting the safety frame on resilient elastomeric supports or mounting devices in which the elastomeric material is solely under a compression load. Resilient mountings for the safety frame reduce the rigidity of the connection of the frame to the vehicle. Further, the incorporation of the safety frame into the interior of the cab results in a requirement for a redesign of both the frame and the cab whenever there is a change in a single one of the two.

In accordance with the present invention, a body for vehicles, such a tractors and the like, has a safety frame for a personnel compartment. The safety frame includes a pair of front and rear, upstanding leg members spaced longitudinally, or fore and aft, on each side of the vehicle body. The passenger compartment is enclosed by a cab which is supported within the safety frame on the leg members thereof. The cab can, therefore, be mounted as a complete unit on the safety frame. The cab is secured to the leg members by resilient support means located generally within a common plane containing the center of gravity of the cab and its operator each of which includes at least one layer of elastomeric material secured between each of the leg members and the cab for resiliently supporting the cab. The layer of elastomeric material is loaded only in shear by the cab. In a second embodiment, the support means has a pair of attachment members respectively connected with the cab and safety frame, and an elastomeric member supporting the cab. The elastomeric member is interconnected with the attachment members in such a manner that the elastomeric member is loaded both in compression and shear in supporting the cab while one of the attachment members is supported from a given leg of the safety frame in a cantilevered manner.

In supporting the cab internally of the safety frame the problem of separating the platform from the cab and the accompanying sealing problem are overcome because the bottom of the cab is integral with it when supported internal to the safety frame. At the same time the safety frame is rigidly attached to the vehicle eliminating the problems of excessive deflection of the safety frame to absorb the required amount of energy because the resilient means is located between the frame and the cab rather than the frame and the vehicle thereby eliminating the resilient support for the safety frame. With the enclosure completely sealed at the bottom infiltration of both dirt and noise are reduced.

Further, the cab size or the frame size can be modified without a necessary change in its counterpart because the dimensional differences may be taken up by the attachment and elastomeric members therebetween.

An advantage of the present structure is the flexibility in locating the attachment members whereas the resilient mount for a safety frame must be located at the base of the frame. The attachment member can be adjusted over the length common to the cab and the frame legs to enable placement of all the members in a plane common with the center of gravity of the cab. The above mounting of the attachment members eliminates the rocking motion often associated with resiliently mounted safety frames.

Figure 1:
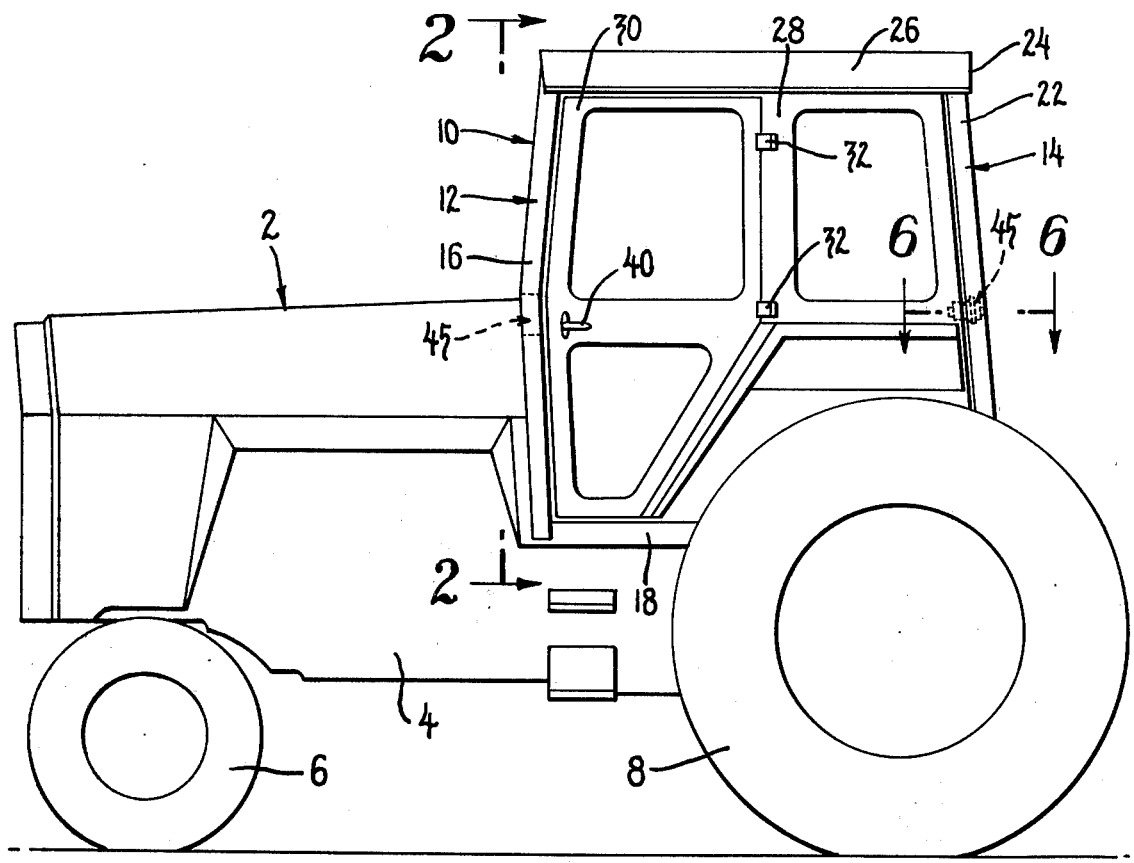
FIG. 1 is an elevational view of a tractor having a body with a safety frame and a cab supported thereon in accordance with the invention.

In FIG. 1, reference numeral 2 collectively designates a tractor having a body 4, front wheels 6, rear wheels 8, and a personnel cab or compartment indicated collectively by reference numeral 10.

Figure 2:
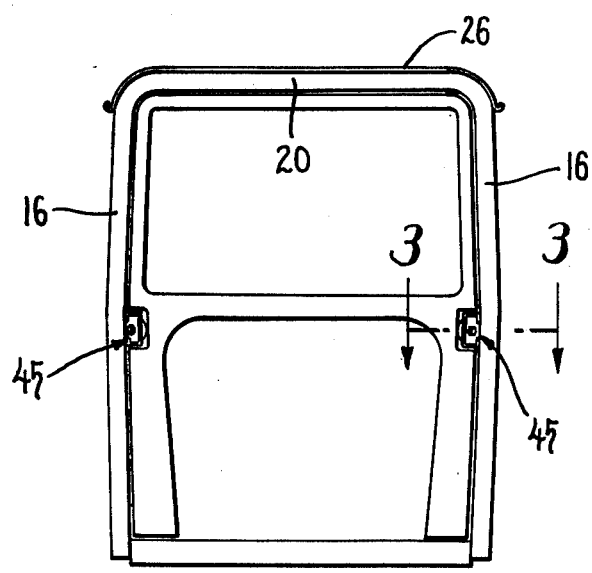
FIG. 2 is a front end view of the cab of the vehicle of FIG. 1 as viewed along lines 2—2 of FIG. 1.
Figure 3:
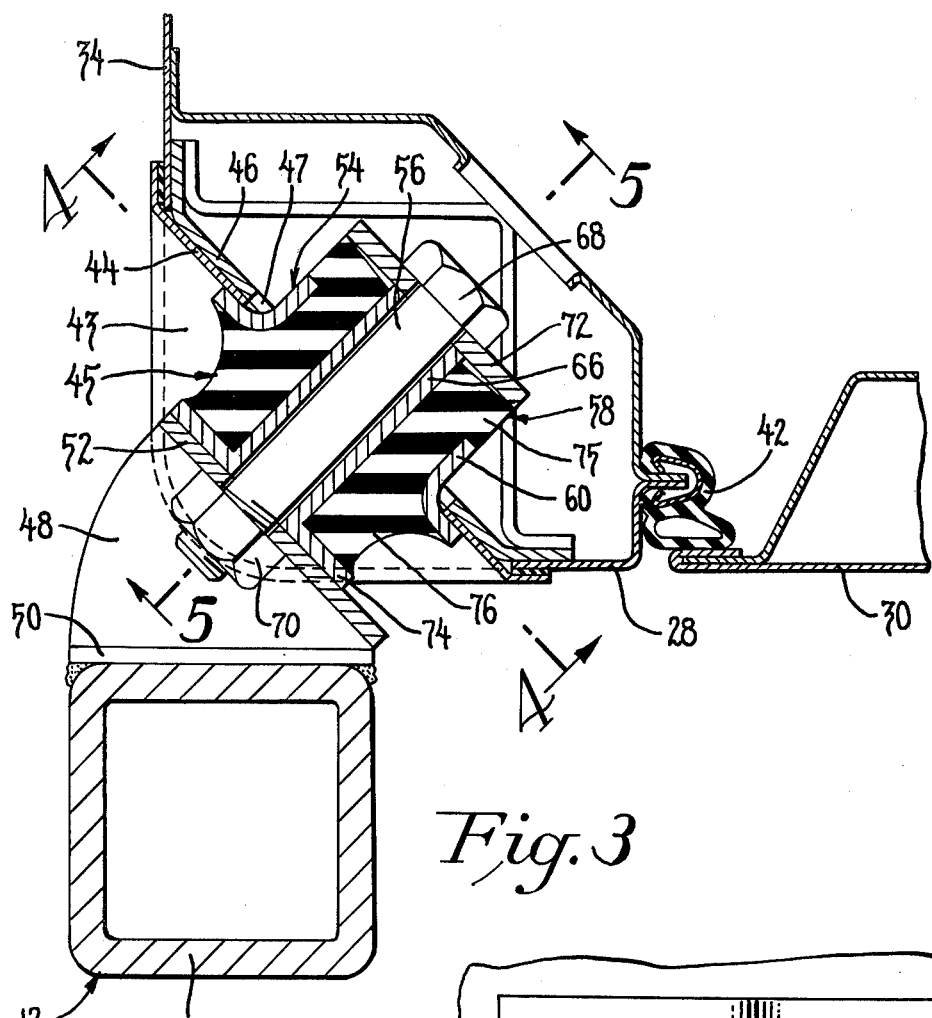
FIG. 3 is a sectional detail view taken on lines 3—3 of FIG. 2.
Figure 4:
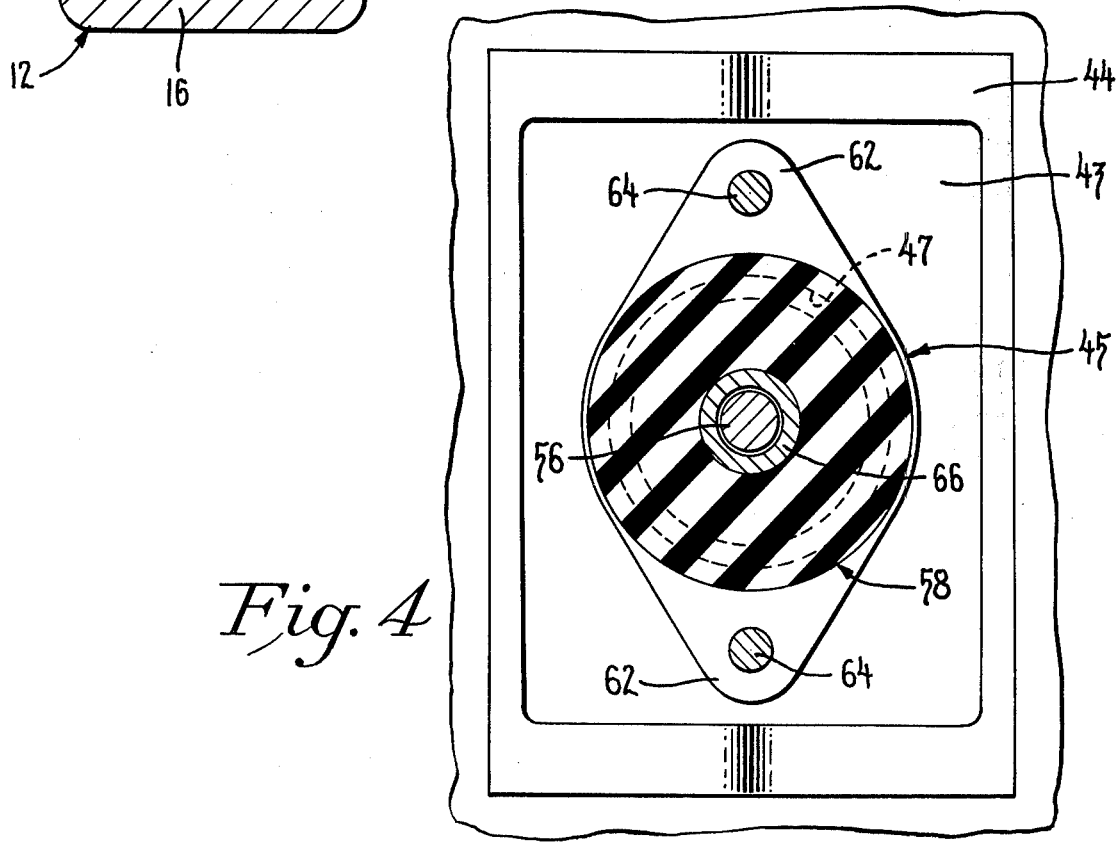
FIG. 4 is a sectional view taken on lines 4—4 of FIG. 3.
Figure 6:
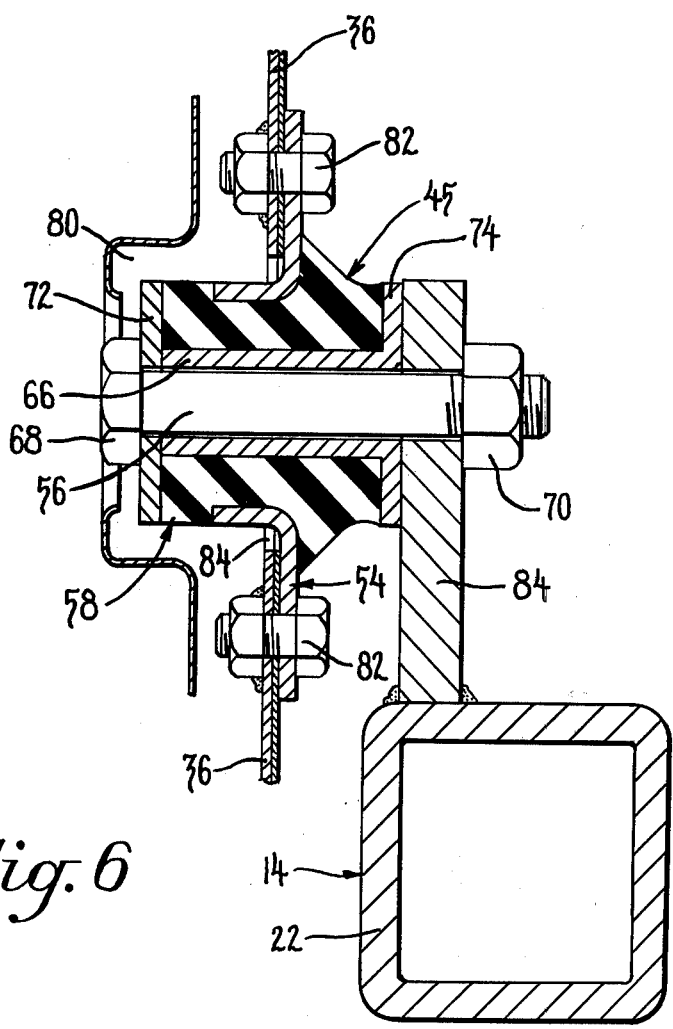
FIG. 6 is a sectional detail view taken on lines 6—6 of FIG. 1.

The safety frame of the cab 10 includes a pair of roll-over bars or frames of generally inverted U-shaped configuration designated by reference numerals 12 and 14. The front frame member 12 has upstanding leg members 16 supported at their lower ends on a horizontal frame member 18 (FIG. 1). The front frame member 12 also includes an upper base member 20 (FIG. 2) extending between the upper ends of the leg members 16. Similarly, the rear frame member 14 includes upstanding leg members 22 also supported at their lower ends on the vehicle frame member 18 or some other rigid portion of the vehicle frame. The rear frame member 14 also includes an upper base member 24 identical to member 20. A hood or roof member 26 is supported on the base members 20 and 24 of the frame members 12 and 14, respectively. As shown in FIGS. 3 and 6, the frame members 12 and 14 are hollow and are of substantially square or rectangular cross section.

The driver or personnel compartment is enclosed by a cab supported on the leg members 16 and 22 of the safety frame members 12 and 14. The cab enclosure includes side walls 20 (FIGS. 1 and 3) and front and rear walls 34 and 36 (FIGS. 3 and 6). At least one of the side walls is provided with a door, the door being indicated by reference numeral 30 in FIGS. 1 and 3. The door 30 is secured to the side wall 28 by hinges 32 and is provided with a conventional handle and latch assembly 40 (FIG. 1). The door 30 engages, in the closed position, elastomeric weather stripping 42 (FIG. 3) secured to the edge of wall 28 that surrounds the opening for the door 30.

A corner panel 44 connects the side wall 28 with the front wall 34 (FIG. 3), and is formed with a recess 43 for receiving a resilient support assembly designated collectively by reference numeral 45. The support assembly 45 supports one corner of the cab on the safety frame, there being a support assembly 45 extending between each leg 16, 22 of the safety frame and the cab at an elevation to place them in or near a common plane with the center of gravity of the cab and operator. The corner panel 44 is reinforced at the recess 43 by a plate 46, and an opening 47 extends through the plate 46 and corner panel 44 for receiving the support assembly 45.

As shown in FIG. 3, a front safety frame support bracket has a plate 50 welded to the leg 16, and a plate 52 extending at an angle from plate 50, the support assembly 45 being secured to the safety frame leg 16 through the bracket 48 as set forth in detail below.

The support assembly 45 includes a pair of attachment members 54 and 56 respectively connected with the cab and safety frame, and an elastomeric member 58 which supports the cab. The cab attachment member 54 has an endless, cylindrical wall 60 projecting axially from a plate portion having lugs 62 projecting from diametrically opposite sides of the cylindrical portion 60 (see FIG. 5). The lug portions 62 are formed with openings for receiving fasteners 64 for securing the lug members 62 to the corner panel and plate 46. The elastomeric member 58 is bonded to the attachment member 54 and is enclosed by the cylindrical wall 60 to entrap a portion of the member 58 between the wall 60 and the attachment member 56. The elastomeric member 58 projects axially beyond both ends of the cylindrical wall 60 from a point on the member 56 which is intersected by a line of intersection on the longitudinal axis of member 54. The elastomeric member 58 is of cylindrical configuration and is formed with a horizontal axial opening coaxial with the cylindrical wall 60. A cylindrical sleeve 66 is mounted in the opening, and the shank of the safety frame attachment member 56 is received in the sleeve 66. Other shapes could be used.

Figure 5:
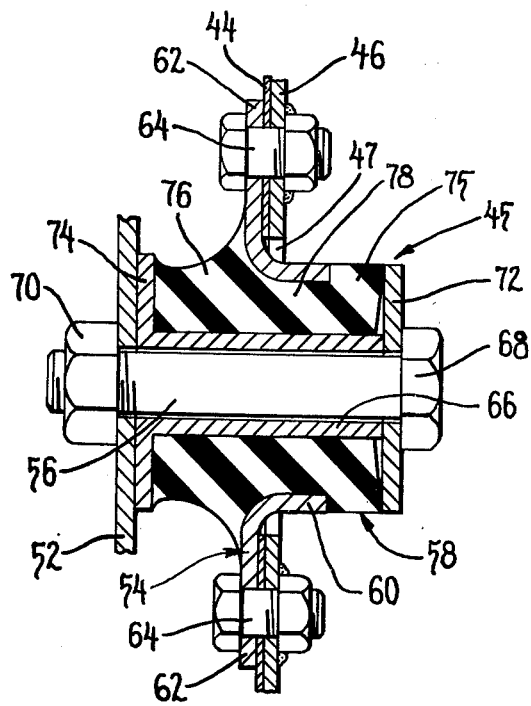
FIG. 5 is a sectional view taken on lins 5—5 of FIG. 3.

The safety frame attachment member 56 has a head portion 68 and a nut 70 threaded onto the end of the shank opposite the head portion 63. A metal washer 72 is clamped against the end of the elastomeric member 58 opposite the safety frame by the head porton 68. A flange 74 provides a seat between the elastomeric member 58 and the safety frame bracket 48 as shown in FIGS. 3 and 5.

The material of the elastomeric member 50 between the washer 72, flange 74 and the cylindrical wall 60 (indicated by reference numerals 75 and 76 in FIG. 5) is loaded in shear by the downward force of the cab. The material of the elastomeric member 58 enclosed by the cylindrical wall 60 (indicated by reference numeral 78 in FIG. 5) is loaded in compression by the downward force of the cab. The elastomer portion 76 in shear provides low frequency vibration isolation while the elastomer 78 in compression safely carries higher loads than the material in shear thereby minimizing cab shock displacements. Furthermore, the construction and arrangement of the components of the support assembly 45 is such that the vibration isolation characteristics are the same in all planes regardless of the direction of the dynamic imposed on the support assembly. For example, in FIG. 3, if a force is envisioned in a horizontal plane and normal to the longitudinal axis of attachment member 56 then the same analysis as given above for the vertical direction in FIG. 5 applies to FIG. 3 for the force described above. Forces in the third plane, along the longitudinal axis of attachment member 56 in FIG. 3, are taken by the elastomeric member 58 in compression along the area of projection of the cylindrical portion 60 toward both the washer 72 and flange 74 and in shear for the remainder of the area.

FIG. 6 illustrates the manner in which the support assembly 45 is supported on the safety frame at the rear of the cab. A recess 80 is formed near the corner of the cab. An opening 84 is formed in the rear plate 36 for receiving the support assembly 45. The attachment member 54 is secured to the rear plate 36 by fasteners 82 while the attachment member 56 is secured to a rear safety frame bracket 84 welded to the safety frame leg 22.

Figure 7:
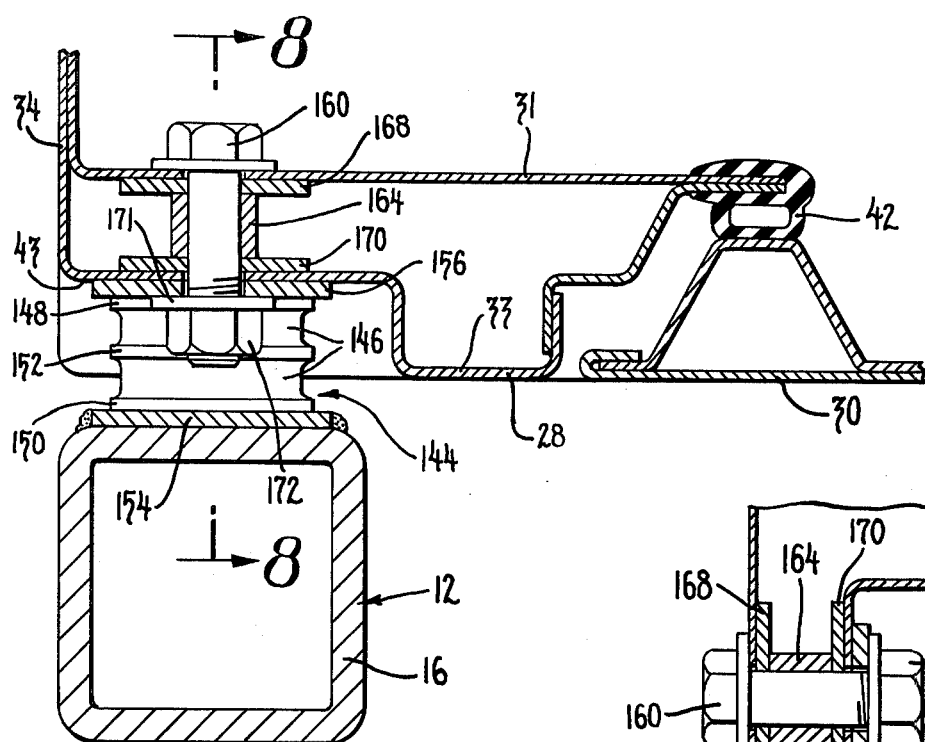
FIG. 7 is a sectional detail view similar to FIG. 3 of an alternate embodiment of the invention.
Figure 8:
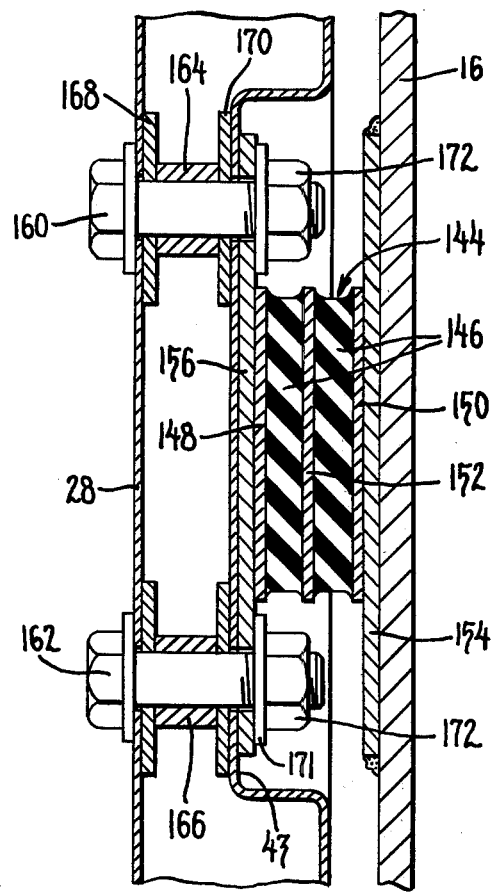
FIG. 8 is a sectional view taken on lins 8—8 of FIG. 7.
Figure 9:
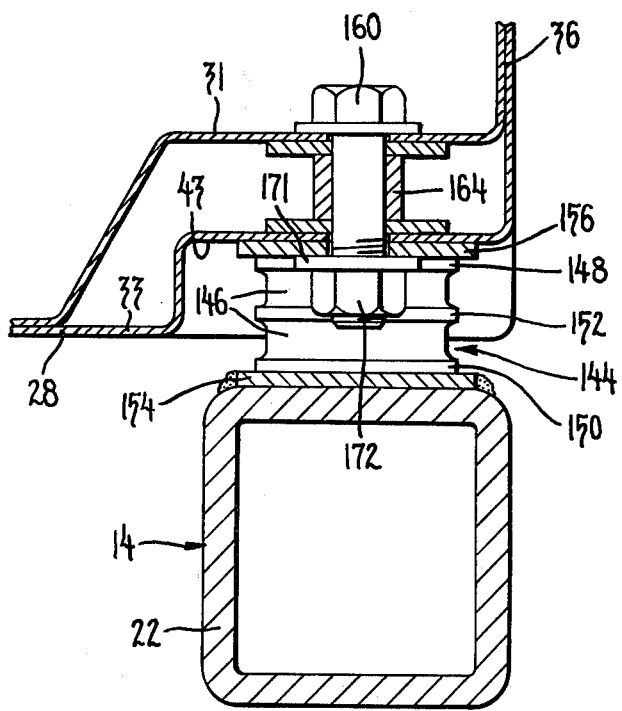
FIG. 9 is a sectional view similar to FIG. 6 of the embodiment of FIG. 7.

In FIGS. 7, 8 and 9, an alternate embodiment is illustrated in which each of the support members 144 includes a pair of outer plate members 148 and 150 and an intermediate plate member 152, and an elastomeric layer 146 is bonded between each of the outer plates 148 and 150 and the intermediate plate 152. Hence, the intermediate plate 152 resiliently floats between the outer plates 148 and 150.

One of the outer plates 148 is secured to the adjacent cab side wall 28 in FIG. 7, and the other outer plate 150 is secured to the leg member 16 in FIG. 7. A plate 154 is welded to the inner surfaces of the leg members 16 and 22, and the outer plate 150 of the support assemblies 144 is welded or otherwise secured to the plate 154. The outer plate 148 is welded or otherwise secured to a mounting plate 156 which in turn is secured by bolt assemblies 160 and 162 (FIG. 8) to the panel 28. The plate 156 is provided with openings for receiving the shanks of the bolts 160 and 162, and spacers 164 and 166 are received between washers 168 and 170 on the inner surfaces of the two panels 31 and 33 making up the side wall 28. Additionally, washers 171 are received betwen the nuts 172 of the fastener assemblies in a conventional manner to secure the cab to the safety frame by the resilient support member 144.

As is apparent from FIGS. 7, 8 and 9, the preassembled cab can be secured as a unit to the inner surfaces of the leg members 16 and 22 of the front and rear safety frame members 12 and 14 by bolting the cab to the mounting plates 156, which in turn are secured to the resilient support members 144. Consequently, the cab is supported entirely on the elastomeric support members 144 in such a manner that the elastomeric layers 146 are loaded solely in shear to provide a high degree of vibration damping and noise reduction.

Furthermore, the resilient mountings of both embodiments reduce shock loading on the cab and thus increases the life of the joints and connections of the cab. The need for close tolerance of cab to safety frame is eliminated by adapting the support members 45, 144 to accommodate both structures. Further, the support members 45 and 144 can accommodate reasonable change in cab size without the necessity to change the size of the safety frame or vice versa.

The location of the members 45 and 144 is also flexible in the present design because of the large surface areas, on both the cab and the frame, which are opposite each other providing a wide range of attachment locations over the length of the frame legs 16 and 22. This provides the advantages of locating the members 45 and 144 in a plane which includes the center of gravity of the cab and operator, thus eliminating the presence of disturbing rocking and pitching modes and the need for costly stabilizing or restricting mounts either at the bottom or at the top of the cab. square of the distance between the center of gravity and the support point. Finally the use of the support members 45 and 144 allows rigid attachment of the safety frame to the vehicle.

While a specific form of the invention has been illustrated in the accompanying drawings and described in the foregoing specification, it should be understood that the invention is not limited to the exact construction shown. To the contrary, alterations in the construction and arrangement of parts, all falling within the scope and spirit of the invention, will be apparent to those skilled in the art.

We claim:

1. A vehicle cab suspension for isolating a completely enclosed cab from the vehicle comprising a plurality of upstanding legs connected to form a safety frame around the cab, sides forming a perimeter between the cab top and bottom, a plurality of support members for sole interconnection between said legs and said sides of the cab located within the safety frame, said support members having a first attachment member rigidly affixed to one of said legs projecting toward said cab sides, a second attachment member rigidly affixed to the cab, an elastomeric member interconnecting said attachment members, said elastomeric member supported by one of said attachment members, said one attachment member including a cylindrical portion fixedly attached to said elastomeric member, said cylindrical portion rigid with respect to said one attachment member for attachment of said elastomeric member independently of the forces required to attach said one attachment member to its support member to permit assembly of the suspension without prestressing said elastomeric member by the attachment forces of said one attachment member, and said legs rigidly attached to the vehicle to suspend the cab within the safety frame on the vehicle.

2. The suspension defined in claim 1 wherein at least some of said support members are located generally within a common plane containing the center of gravity of the cab and its operator.

3. The suspension defined in claim 1 wherein said support members are located closer to a horizontal plane passing through the center of gravity of the cab and its operator than to the point of attachment of said legs to the vehicle.

4. A vehicle cab suspension for isolating a completely enclosed cab from the vehicle comprising a plurality of upstanding legs connected to form a safety frame around the cab, sides forming a perimeter between the cab top and bottom, a plurality of support members for sole interconnection between said legs and said sides of the cab located within the safety frame, said support members having a first attachment member affixed to one of said legs and a second attachment member affixed to the cab, an elastomeric member interconnecting said attachment members, said elastomeric member supported by one of said attachment members, said one attachment member fixedly attached to said elastomeric member independently of the forces required to attach said one attachment member to its support member to permit assembly of the suspension without prestressing said elastomeric member by the attachment forces of said one attachment member, said first attachment member passing through said elastomeric member to cause a portion of said elastomeric member, on the line of intersection between said attachment members, to be entrapped between said first attachment and an extension of said second attachment member perpendicular to said line of intersection to provide a surface for taking loads in compression, the remaining portion on said elastomeric member being uninhibited by said second attachment member for taking loads in shear and said legs rigidly attached to the vehicle to suspend the cab within the safety frame on the vehicle.

5. The suspension defined in claim 4 wherein said first attachment members are cantilevered from said legs.

6. A vehicle body having a safety frame mounted thereon, a cab suspended on the safety frame at least partially enclosing a personnel compartment, and resilient support means on a generally horizontal plane for sole support of said cab on said safety frame, said support means including a pair of attachment members respectively rigidly connected with the cab and safety frame, one of said pair of attachment members projecting toward said cab, and an elastomeric member supporting the cab, said elastomeric member being interconnected with the attachment members, said elastomeric member supported by one of said attachment members, said one attachment member including a cylindrical portion fixedly attached to said elastomeric member, said cylindrical portion rigid with respect to said one of said pair of attachment members for attachment of said elastomeric member independently of the forces required to attach said one attachment member to its support member to permit assembly of the cab suspension without prestressing said elastomeric member by the attachment forces of said one attachment member such that the elastomeric member is loaded both in compression and shear by the cab.

7. A vehicle body as claimed in claim 6 wherein one of said attachment members has an endless wall enclosing said elastomeric member.

8. A vehicle body as claimed in claim 7 wherein said elastomeric member projects beyond both ends of said endless wall.

9. A vehicle body as claimed in claim 8 wherein said elastomeric member is formed with an axial opening, and said one attachment member extends through said opening.

10. A vehicle body as claimed in claim 9 wherein said elastomeric member is cylindrical, and said cylindrical portion of said one attachment member includes a cylindrical sleeve received in said opening, said one attachment member having a shank received in said sleeve.

11. A vehicle body as claimed in claim 10 wherein said one attachment member includes a head portion at one end of said shank and a nut threadedly engaged with the other end of said shank.

12. A vehicle body as claimed in claim 11 wherein said other attachment member is connected with said cab and constitutes a cab attachment member, and said one attachment member is connected with said safety frame and constitutes a safety frame attachment member, said elastomeric member being supported on said safety frame by said safety frame attachment member.

13. A vehicle body comprising: a pair of spaced fore and aft safety frame members each having a pair of laterally spaced upstanding safety frame legs; a cab suspended on the safety frame for at least partially enclosing a personnel compartment; and a resilient support assembly connected between the cab and the adjacent safety frame leg at the inner side of said leg, each of said support assemblies including a safety frame attachment member rigidly connected with said adjacent safety frame leg, a cab attachment member connected with said cab, and an elastomeric member supporting the cab between said attachment members, said elastomeric member being interconnected with said attachment members, said elastomeric member supported by one of said attachment members, said one attachment member fixedly attached to said elastomeric member independently of the forces required to attach said one attachment member to its support member to permit assembly of the cab suspension without prestressing said elastomeric member by the attachment forces of said one member such that the elastomeric member is loaded both in compression and in shear by the cab, said elastomeric member formed with a horizontal axial opening, and one of said attachment members having a shank portion extending through said axial opening, the other of said attachment members having an endless wall coaxial with said axial opening and surrounding said elastomeric member over a portion of its length such that the material of said elastomeric member is surrounded by said endless wall in compression by the weight of said cab and the material of that porton of said elastomeric member projecting beyond the endless wall being loaded in shear by weight of said cab, a support bracket secured to said safety frame leg, said one attachment member constituting the safety frame attachment member and being connected with said bracket, said other attachment member constituting the cab attachment member and being connected with the cab, a washer and a flange, both being retaining members, said retaining members contained by said frame attachment members and each received on one end of said elastomeric member, said safety frame attachment members having a head portion on end end of said shank and a fastener threaded onto the other end of said shank, one of said retaining members being disposed between said elastomeric member and said bracket, and said safety frame attachment member retaining said elastomeric member between said retaining members.

14. A vehicle body as claimed in claim 13 wherein said cab attachment member includes a pair of lugs projecting in diametrically opposite directions from said endless wall, said legs being formed with fastener receiving openings for securing said cab attachment members to said cab.

* * * * *